(12) United States Patent
Lopresti

(10) Patent No.: US 6,298,173 B1
(45) Date of Patent: *Oct. 2, 2001

(54) STORAGE MANAGEMENT SYSTEM FOR DOCUMENT IMAGE DATABASE

(75) Inventor: Daniel P. Lopresti, Hopewell, NJ (US)

(73) Assignee: Matsushita Electric Corporation of America, Secaucus, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/943,428

(22) Filed: Oct. 3, 1997

(51) Int. Cl.⁷ ........................................ G06K 9/54
(52) U.S. Cl. ................. 382/305; 382/176; 382/232; 382/305; 358/1.17
(58) Field of Search ..................... 382/305, 176; 707/103, 104, 10, 102; 395/114, 115, 116

(56) References Cited

U.S. PATENT DOCUMENTS

| | | | |
|---|---|---|---|
| 4,503,556 | 3/1985 | Scherl et al. | 382/176 |
| 4,741,046 | 4/1988 | Matsunawa et al. | 382/176 |
| 4,750,209 | 6/1988 | Shimura et al. | 382/176 |
| 4,817,050 * | 3/1989 | Komatsu et al. | 707/10 |
| 4,893,188 | 1/1990 | Mura.kami et al. | 358/456 |
| 5,001,767 | 3/1991 | Yoneda et al. | 382/176 |
| 5,351,314 | 9/1994 | Vaezi | 382/264 |
| 5,436,732 * | 7/1995 | Mikami | 358/444 |
| 5,465,304 * | 11/1995 | Cullen et al. | 382/176 |
| 5,479,587 * | 12/1995 | Campbell et al. | 395/116 |
| 5,483,622 * | 1/1996 | Zimmerman et al. | 395/114 |
| 5,555,362 | 9/1996 | Yamashita et al. | 707/517 |
| 5,568,571 * | 10/1996 | Willis et al. | 382/254 |
| 5,588,072 | 12/1996 | Wang | 382/176 |
| 5,631,984 * | 5/1997 | Graf et al. | 382/317 |
| 5,680,478 * | 10/1997 | Wang et al. | 382/176 |
| 5,680,479 | 10/1997 | Wang et al. | 382/176 |
| 5,699,453 | 12/1997 | Ozaki | 382/176 |
| 5,703,962 | 12/1997 | Niki et al. | 382/173 |
| 5,748,865 | 5/1998 | Yamamoto et al. | 345/423 |
| 5,751,849 | 5/1998 | Ikeda | 382/176 |
| 5,757,957 | 5/1998 | Tachikawa | 382/176 |
| 5,767,978 | 6/1998 | Revankar et al. | 358/296 |
| 5,774,579 | 6/1998 | Wang et al. | 382/176 |
| 5,802,524 * | 9/1998 | Flowers et al. | 707/103 |
| 5,848,184 | 12/1998 | Taylor et al. | 382/173 |
| 5,848,191 | 12/1998 | Chen et al. | 382/229 |

* cited by examiner

Primary Examiner—Matthew C. Bella
Assistant Examiner—Gregory Desire
(74) Attorney, Agent, or Firm—Harness, Dickey & Pierce, P.L.C.

(57) ABSTRACT

A method of managing storage in a document image database using document analysis to partition documents into logical regions and modified by reducing storage size of the regions using different reduction means according to various storage preference rules. Storage preference rules are intended to maintain high quality representations of important document information while reducing storage requirements at the expense of lesser important aspects of the document. In particular, the different reduction means applied to stored document images includes reducing sampling depth, reducing sampling resolution based on minimum font size, utilizing lossy and lossless compression schemes and discarding unimportant regions of document image. Over time, document analysis and modification can be repeated to further reduce the storage size of previously stored data files.

33 Claims, 10 Drawing Sheets

Grayscale histogram for a photographic region.

Grayscale histogram for a text region.

300 dpi resolution 200 dpi resolution 100 dpi resolution

Original Image (272,414 bytes).

Mild JPEG (110,321 bytes)

Moderate JPEG (29,863 bytes)

Agressive JPEG (13,831 bytes).

 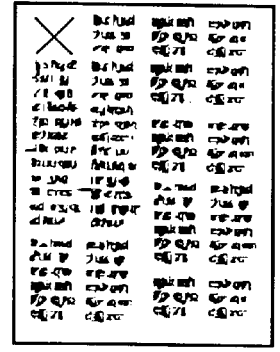
Post-It Pre-Printed with "Important"
FIGURE 10A    FIGURE 10B
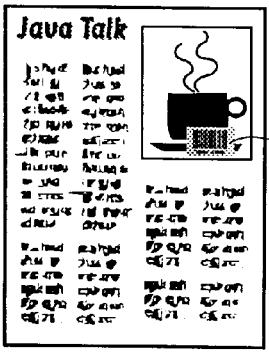 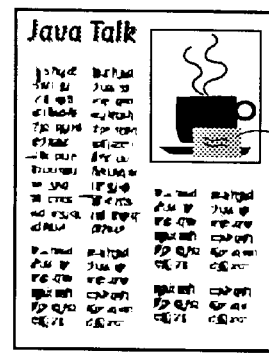
Post-It with Bar Code
"Discard in 6 Months"
FIGURE 12A    FIGURE 12B

STORAGE MANAGEMENT SYSTEM FOR DOCUMENT IMAGE DATABASE

BACKGROUND OF THE INVENTION

1. Technical Field

The present invention relates generally to a storage management system for a document image database, and more particularly to a method of managing storage in a document image database using document analysis to partition documents into logical regions and document reduction means for reducing storage size of the regions according to various storage preference rules.

2. Discussion

Storage management is a central issue in document image database systems. Users are expressing an increasing interest in being able to save and retrieve documents in image form. However, despite the growing size of hard disks and removable media, current storage capacity in document image database systems is inadequate for supporting a paperless office. To illustrate the problem, a standard 8½×11 page (with 1 inch margins on all sides) scanned at 300 dpi would measure 1,950×2,700=5,265,000 pixels. In grayscale, each pixel requires one byte to represent, and thus would require approximately 5 megabytes of storage. The scanned page in 24-bit color would require 15 megabytes and in bitonal would require 658,125 bytes to store. Hence, 1,000 similar scanned pages could require between 600 megabytes and 15 gigabytes to store in a document image database. Since the average office contains far more than 1,000 pages, good techniques are needed for effectively managing storage in a document image database.

Within a document image database, there is a classic trade-off between the quality of a document image and the size of its stored data file. Generally, a high quality representation of the document requires more space to store. To maintain an acceptable level of quality, requires a document image database with excessive capacity. By reducing the storage requirements for the lesser important parts of documents, storage capacity may be reduced while maintaining the high quality of the important aspects of documents. Typically, storage management begins by scanning every document at the same predetermined depth and resolution, such that the minimal acceptable settings required to maintain image quality in a particular document are applied to all documents. Scanning each part of every document at the same depth and resolution irrespective of its contents requires excessive storage space. Furthermore, once entered into the system, the storage size of a document is not further analyzed for possible reduction. Alternatively, storage management may begin with a system user manually specifying the scanning depth and resolution for each document entered into the system. In this way, the scanning parameters and image representation details can be specialized to each situation, but only at the high cost of unnecessary user intervention. Moreover, these manual storage management strategies are only applied at the document level and only at the time a document is inputted into the system.

Accordingly, a need exists for an efficient method for managing storage within a document image database. Sophisticated document analysis and storage management techniques should be used to decrease the size of the document image database while maintaining a high level of quality in document image. It is further desirable that the document analysis methods automatically locate and identify regions in a scanned document image. Different storage management techniques can then be applied to each region, and thus reducing the overall size of a stored document image while maintaining the quality of important regions within a document. Over time, documents can be reanalyzed and storage management techniques can be reapplied to further reduce storage size of previously stored document images.

SUMMARY OF THE INVENTION

The present invention is a method of managing the storage of documents in a document image database system. Once a document has been converted into an digital data file within the database system, logical regions are identified within the document according to predetermined rules. The digital data file representing the document can then be partitioned into different regions and modified by storage reduction means according to storage preference rules. After reducing the storage size of each region into a smaller reduced region, the regions are compiled into a reduced data file and stored in a database system. Over time, document analysis and modification can be repeated to further reduce the storage size of previously stored data files.

BRIEF DESCRIPTION OF THE DRAWINGS

Additional advantages and features of the present invention will become apparent to those skilled in the art upon reading the following detailed description and upon reference to the drawings in which:

FIGS. 10A and 10B are example documents which illustrate user annotations for triggering a predetermined storage preference rule;

FIGS. 12A and 12B are example documents which illustrate user annotations that encapsulate a storage preference rule;

DETAILED DESCRIPTION OF THE PREFERRED EMBODIMENT

The following description of the preferred embodiment is merely exemplary in nature and is in no way intended to limit the invention or its application or its uses.

Figure 1:
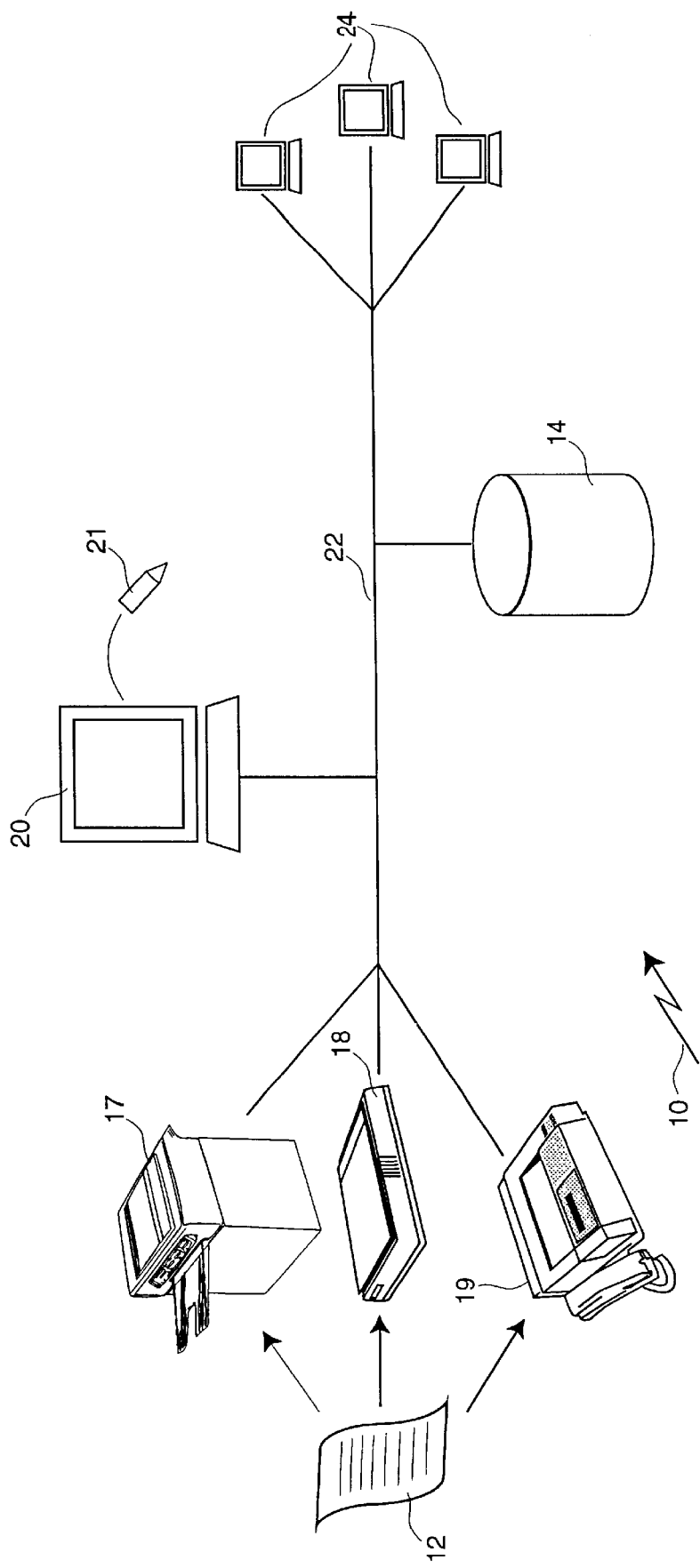
FIG. 1 is a diagram showing suitable configurations for system components to support storage management in a document image database system.

FIG. 1 shows suitable system components to support storage management strategies in a document image database system 10. In the present invention, a variety of input devices may be used to input a document 12 into a document image database system 10. For example, a document 12 may be directly inputted into a document image database system 10 by using a digital copier 17 or a document scanner 18. Alternatively, a previously digitized document 12 may be received into the document image database system 10 from a remote location. For instance, a document may be downloaded from the Internet or sent via a facsimile machine 19 from a remote terminal. Regardless, a document 12 is converted into a digital document file and stored within a document image database 14. Each of the system components are connected along a network 22. A computer user interface 20 allows a system user to view stored documents and to construct storage preference rules for managing the database system 10. In addition, an electronic pen 21 may be attached to the user interface 20 to facilitate identifying storage preferences by the user. For instance, once a document has been inputted into the system, a user may use the pen 21 to electronically "mark-up" important areas within a stored document. Finally, various remote computers attached along the network 22 serve as output devices 24 which allow users to view document images stored within the document image database system 10. Those skilled in the art will appreciate that a variety of document management components can be used to create different configurations for a document image database system 10.

Figure 2:
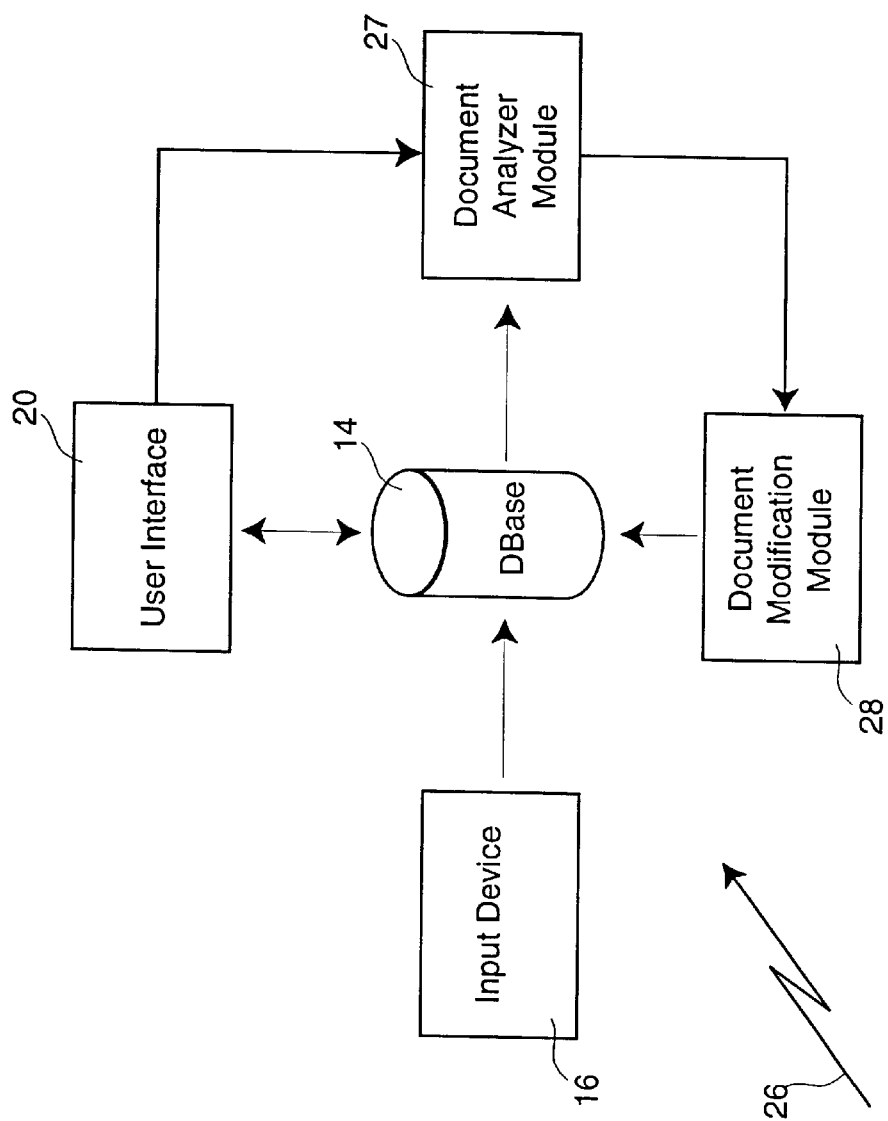
FIG. 2 is a block diagram showing the primary components of an apparatus of the present invention.

An apparatus 26 for supporting storage management of documents in a document image database is illustrated in FIG. 2. The primary components of the apparatus 26 include a document analyzer module 27 coupled the document image database 14, and a document modification module 28 coupled to at least one of the document analyzer module 27 and the database 14. In addition, an input device 16 and a user interface module 20 are coupled to the document image database 14.

Figure 3:
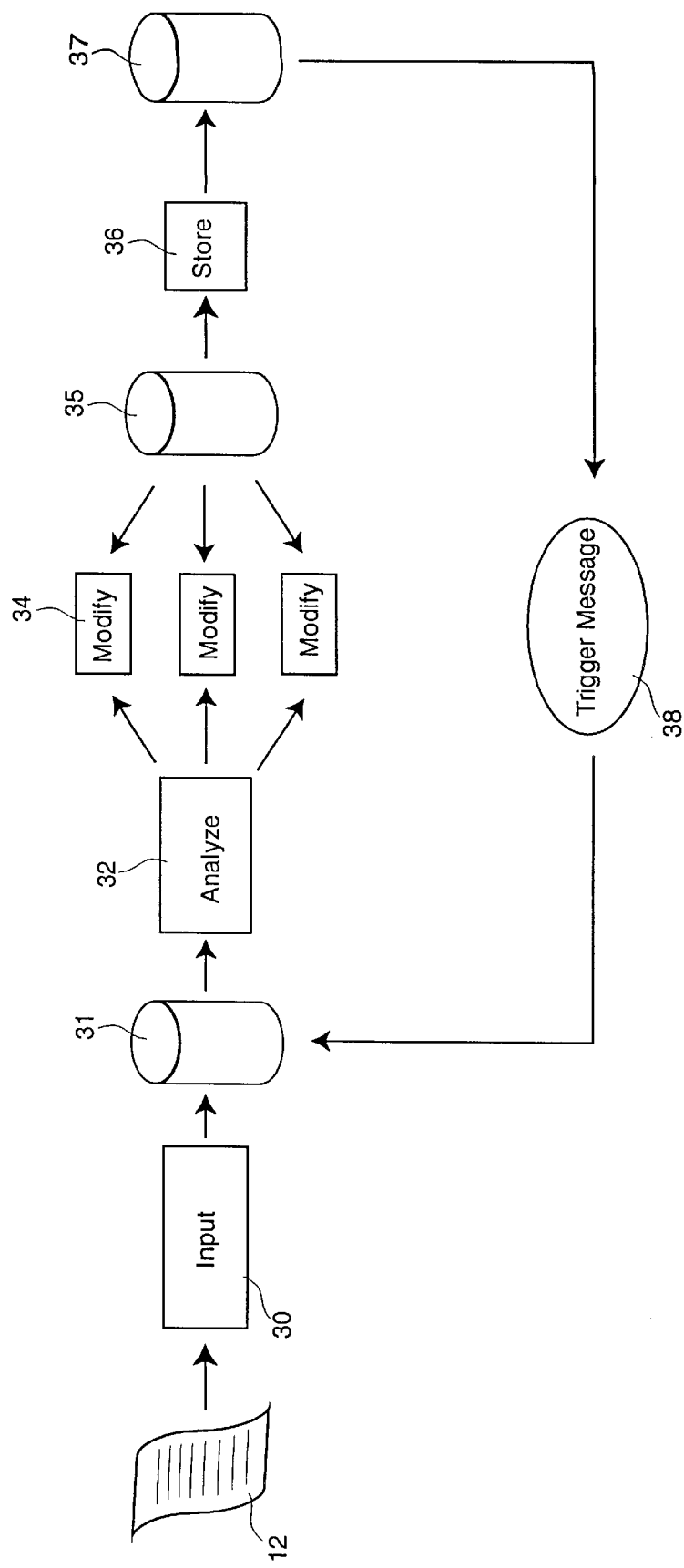
FIG. 3 is a block diagram showing the principal functions of the present invention.

Primary steps for managing the storage of documents in a document image database system 10 are illustrated in FIG. 3. Once a document 12 has been inputted 30 into the document image database system 10, the data file 31 representing the document can be analyzed 32. Document analysis 32 includes identifying logical regions within the document and partitioning the data file into identified regions. Each logical region can be modified 34 by reducing its storage size according to storage preference rules. Storage preference rules can be individually tailored to the unique characteristics of each region. Individual regions are recompiled into a data file 35 before being stored 36 as a stored data file 37 in the database 14. Over time, a trigger message 38 may be generated within the document image database system 10 to reinitiate document modification for either a particular document or for all documents stored within the system. then analyzed using connected-component analysis to extract certain geometric data related to the connected components or blobs of ink that appear on the image page. This geometric data or connected component data is stored in a data structure that is then analyzed by a classification process that labels or sorts the data based on whether each connected component has the geometric properties of a character, or the geometric properties of a portion of an image, such as a bitmap rendition of a photograph.

Following classification, for text components the system then invokes a nearest-neighbor analysis of the connected component data to generate nearest neighbor graphs. These are stored in a nearest-neighbor graphs data structure that represents a list of linked lists corresponding to the nearest neighbors of each connected component. The nearest-neighbor graphs define bounding boxes around those connected components of data that correspond to, for example, a line of text in a caption. The nearest-neighbor graphs are then classified as horizontal or vertical, depending on whether the links joining the bounding box centers of nearest neighbors are predominately horizontal or vertical. Vertical text lines, although rarely encountered in the English language, are quite common in other languages, such as Chinese or Japanese.

Figure 4:
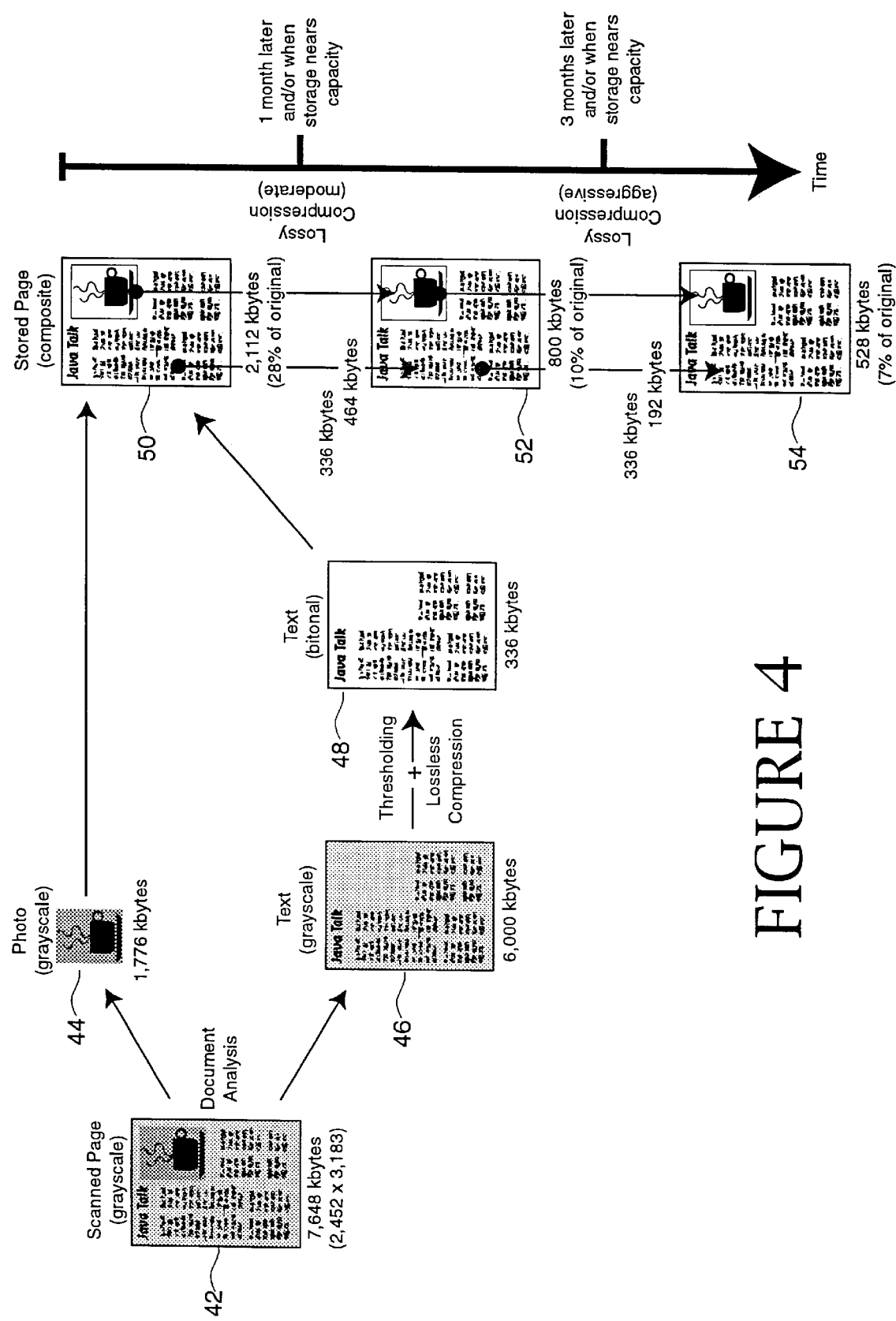
FIG. 4 is a functional diagram showing the steps for reducing storage capacity in a document image database using the storage management techniques of the present invention.

Next a filter module analyzes the data to determine the average font height of all horizontal data, and a separate average font height for all vertical data. Then, each string of horizontal data is compared with the average; and each string of vertical data is compared with the average, to select those strings that are above the average height or those strings whose height exceeds a predetermined threshold. If desired, further refinement of the analysis can be performed using other geometric More particularly, FIG. 4 shows a functional diagram applying storage management strategies to an example document. The original document 42 requires 7,648 kbytes to store the scanned document as a data file 43 in the database system 10. However, by analyzing and modifying the data file 43 according to the method of the present invention, the stored data file 54 can be reduced to 528 kbytes.

Figure 5A:
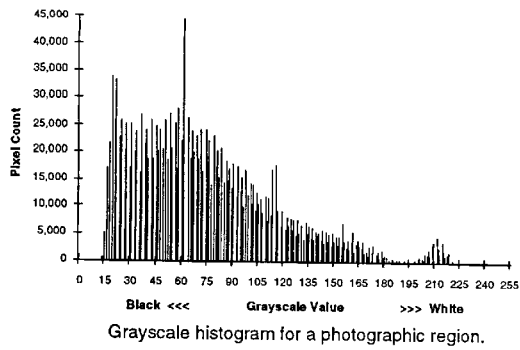
FIG. 5A is a grayscale histogram for a photographic region of a document.
Figure 5B:
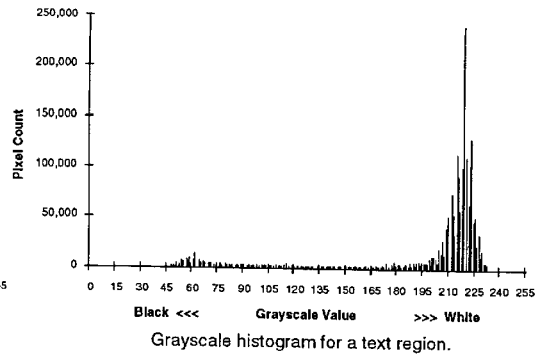
FIG. 5B is a grayscale histogram for a text region of a document.

Document analysis begins by identifying logical regions within the document, and then partitioning identified regions for further storage manipulation. Effective storage management requires being able to automatically locate and identify . logical regions within a document. Rules for identifying logical regions may be established within the system based upon various criteria. For example, grayscale histogram analysis or connected-component analysis are techniques that can be used to identify regions according to the type of data (i.e., text, illustrations, photographs, etc.) found in the document. The grayscale histogram for a photo looks quite different from the one for the text region. The histogram for a photographic region, as shown in FIG. 5A, consists of a much broader range of grey values, whereas the histogram for the text, as shown in FIG. 5B, consists of many white pixels (the background) and a low range of grey pixels culminating in a small peak near black (the characters). These kinds of properties can be exploited to break the page into logical regions based on data type.

Connected-component analysis is another identification method. The bit map image data is analyzed by connected component extraction to identify components or connected components that represent either individual characters or letters or regions of non-text image. More specifically, the invention extracts titles, captions and photographs from document images using document analysis and computational geometry techniques. The image is stored in a bitmap buffer that is features, such as whether the fonts are boldface, or by identifying which data represent strings that are centered on the page.

After having selected the title candidates, the candidates are referenced back to the original bitmap data. Essentially, the bounding boxes of the connected components are merged into a single bounding box associated with the extracted title and that single bounding box is then referenced back to the bitmap data, so that any bitmap data appearing in the bounding box can be selected as an extracted title. If desired, the extracted title can be further processed using optical character recognition software, to convert the title image into title text.

Similarly, after having selected the photo candidates, the candidates are again referenced back to the original bitmap data. The bounding boxes of photo candidates which overlap with each other are merged into a single bounding box so that bitmaps appearing within the bounding box can be selected and extracted as part of the photo. If desired, caption text associated with a photo region can be identified and processed using optical character recognition software. The caption text can then be used as a tag to help identify the content of the photo, or for later searching. The connected-components analysis method is generally disclosed in U.S. Ser. No. 5,892,843 which is hereby incorporated by reference. This analysis can also be used to identify logical regions within a document.

For the example document of FIG. 4, a first region 44 with a photograph data type and a second region 46 with a text data type have been identified in the original document 42. Once each region has been identified, the first region (photograph) 44 can be extracted from the second region (text) 46 for additional document modification. Next, the regions will be modified to reduce their storage size. Modification may include a variety of storage reduction means depending upon applicable storage preference rules. The various storage reduction means that can be employed in the modification step are discussed below.

Sampling depth refers to the number of bytes required to represent a single pixel. Common depths supported by current scanner hardware/software include 24 bit (color), 8 byte (grey scale), and 1 bit (bitonal). Other input devices used in a document image database system, such as faxes and digital copiers, may utilize a more limited selection of possible sampling depths. Scanning documents as bitonal instead of grey scale yields an eight times reduction in the amount of space required to store an image. Furthermore, there is three times reduction is space required to store an image as grey scale rather than 24 bit color. Therefore, a twenty four times reduction can be achieved when saving a 24 bit color region as a bitonal region. Those skilled in the art will recognize that by using thresholding methods the sampling depth of an image can be reduced without having to rescan the original document. Although lowering the sampling depth has the obvious advantage that it lessens the storage requirements for the document, this storage reduction means must be carefully administered to prevent losing important information from the original document. In the case of photographs, significant detail can be obscured when mapping from color to bitonal, however reduction to a greyscale level may provide adequate detail for many applications. On the other hand, text is often easier to read when it is presented as crisp black characters on a white background and thus is conducive to being stored as a bitonal image. Therefore, the document image database system may utilize a storage preference rule that reduces the sampling depth of a text region to a bitonal level, while only reducing a photographic region to a greyscale level.

Figure 6A:
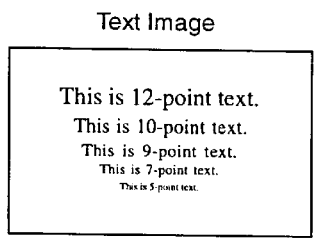
FIGS. 6A–6C are text images showing the readability of different font sizes of text sampled at varying resolutions.
Figure 6B:
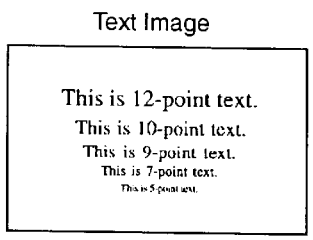
Figure 6C:
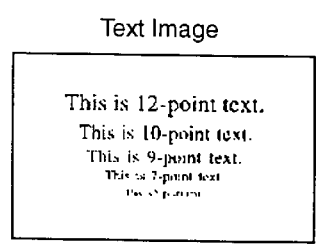

Reducing sampling resolution is another storage reduction means. Resolution is the number of samples per unit taken along one dimension of the image. The initial resolution an image is sampled at can vary depending on the input hardware. For instance, the standard resolution used by many flatbed scanners is 300 dpi, whereas a standard CCITT Group 3 fax resolutions are 204×196 (high) and 204×98 (low). Reducing sampling resolution from 300 dpi to 150 dpi lowers storage apace by a factor of 4. Furthermore, reducing resolution of a stored image can be accomplished without rescanning the original document. As with depth reduction, reducing sampling resolution must be cautiously applied to prevent losing important detail in the stored document image. Photographs may look more "coarse". With respect to text, the degree of degradation is dependent on font size. A larger point font can be sampled at a lower resolution and still remain readable; this can be seen in FIGS. 6A–6C, where the same text is scanned at three different resolutions: 300 dpi, 200 dpi and 100 dpi. To prevent unreadable text, storage preference rules must account for minimum font size within a specific region. Document analysis can be performed to determine the minimum font size of a particular region or document, then that specific area can be downsampled as appropriate. If a region includes 9-point text, as best seen in FIG. 6C, then the text remains readable at 100 dpi reduction. On the other hand, to maintain readability in a region containing 7-point text, as best seen in FIG. 6B, sampling should only be reduced to 200 dpi. Accordingly, a storage preference rule should be constructed to reduce sampling resolution based on the minimum font size and the desired readability for the particular region and/or document. Similarly, a document may be reduced by down sampling based on other minimum feature sizes contained in a region. For example, a line drawing may have a minimum line width which can be used as the minimum feature size.

Figure 6D:
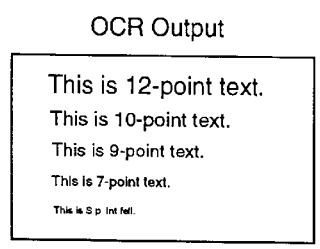
FIGS. 6D–6F are text images showing the OCR output from input text in different font sizes sampled at varying resolutions.
Figure 6E:
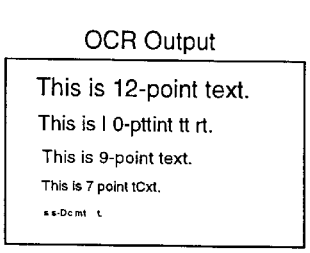
Figure 6F:
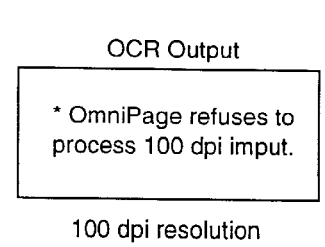

Furthermore, lower sampling resolutions can greatly reduce the accuracy of optical character recognition (OCR) software. To facilitate subsequent text searching of a document, a document may be initially scanned into the system at a high resolution to adequately support OCR functions. Note that OCR is more sensitive to sampling resolution than a human reader, and thus text that is relatively easy for a human to read generates unreliable OCR results. OCR results generated by running Caere OmniPage Professional (version 6.0) at resolutions of 300 dpi and 200 dpi (100 dpi results not available; OmniPage has minimum input resolution of 200 dpi) are shown in FIGS. 6D–6F. Once key search terms have been extracted from the stored data file using OCR software, storage preference rules can be applied to further reduce the sampling resolution of the data file. As a result, OCR has captured information needed to support searching functions, and yet the document can be subsequently reduced to minimize storage requirements in the system.

Additional storage reduction means that can be applied to document images includes various compression schemes. Generally compression schemes may be either lossless compression or lossy compression Lossless compression refers to those schemes where the original data can be recovered perfectly from the compressed version. General purpose lossless algorithms include Huffman and Lempel-Ziv coding. Run length coding scheme is particularly suited to scanned text images and can achieve compression ratios of 7:1. To achieve better compression than this, it is necessary to relax the restriction that the original data be perfectly recoverable. In lossy compression, the image that results from decompression may contain some amount of degradation. The JPEG standard is an example of such. a scheme. JPEG is a low pass filter that removes high frequency information from the image to reduce the number of bits needed to represent the image and it is primarily intended for compressing photographs. JPEG can achieve compression ratios of 20:1or better.

Figure 7A:
FIGS. 7A–7D are grayscale images of a fishing boat showing the degradation of lossy compressed image using increasingly aggressive JPEG settings.
Figure 7B:
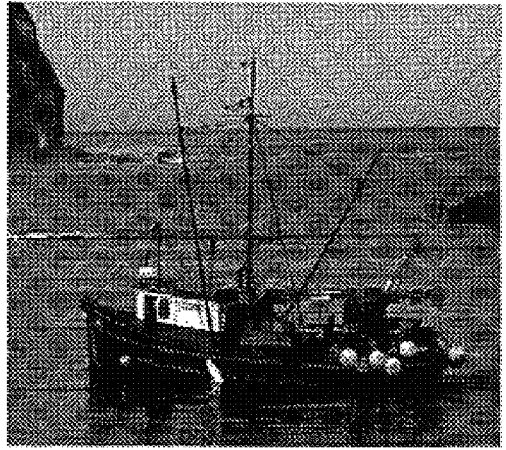
Figure 7C:
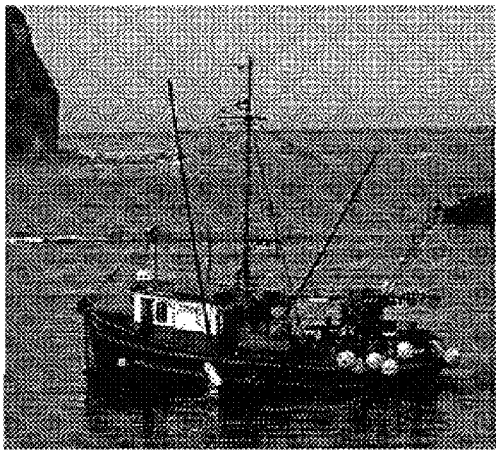
Figure 7D:
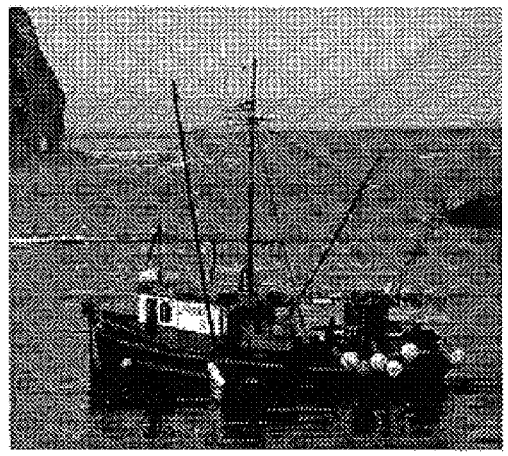

The effects of JPEG compression are illustrated in FIGS. 7A–7D, where a grayscale image of a fishing boat is shown along with three versions of this same image that have been compressed using increasingly aggressive JPEG settings. FIG. 7A is the original document image. In FIG. 7C the image is about 10% the size of the original image without any noticeable degradation, whereas the image in FIG. 7D shows obvious degradation. Minor degradations may be acceptable in some applications, and thus different storage preference rules may be appropriate for different applications. For instance, when photographs are essential to understanding the document, then a moderate JPEG compression should be applied. On the other hand, if the primary information of interest is the text of a newspaper article and any associated photograph is only supplementary, then more aggressive JEPG compression may be applied to the photographic region. JEPG does not work well for text, and thus an appropriate storage preference rule may discriminately apply JPEG compression only to the photographic regions of the document.

Returning to the example of FIG. 4, the storage size of the second region (text) 46 is reduced from 6,000 kbytes to 336 kbytes by reducing sampling depth and then applying a lossless compression scheme. When the 1,776 kbytes from the first region (photo) 44 are compiled with the 336 kbytes of the reduced second region (text) 48, the resulting stored data file 50 is 28% (2,112 kbytes) of the original document 42. At a subsequent time, the stored data file 50 can be further modified according to predetermined storage preference rules. Generally, subsequent modification will occur without having to reinitiate document analysis. Initial document analysis will capture needed information for later document modification. Re-running document analysis may be applicable if: (1) new and better document analysis routines have become available, or (2) the user has changed his/her preferences in a way that requires re-running document analysis.

In this instance, the storage preference rule requires that a moderate lossy compression scheme be applied to photographic regions of the document one month after the document was inputted into the system. By applying this storage preference rule to the stored data file 50, the first region (photo) 44 is reduced to 464 kbytes, and thus the stored data file 50 is further reduced to a first reduced data file 52 which is 10% (800 kbytes) of the original document 42. At an even later time, a more aggressive lossy compression scheme is applied to the first region (photo) 44 of the first reduced data file 52 to achieve a second reduced data file 54 of 528 kbytes or 7% storage size of the original document 42. Therefore, by partitioning the document into regions and reducing the storage size of the regions according to the data type of the region, storage requirements for this example document have been significantly reduced. Moreover, although compressing photographic regions without losing quality may not appear impressive, applying storage reduction techniques to documents containing text and photos without degrading the overall page quality is critical.

As seen in the above discussed example, applying document reduction means throughout the life of a database system will also drastically decrease system storage requirements. An occurrence of a condition within the database system can initiate this further modification of documents. Since a documents importance generally lessens over time, the importance of an individual document may be determined by the amount of time since the document was inputted into the system or the amount of time since any user last accessed that particular data file. These indicators serve as conditions that will trigger the reanalysis process. Determining that a threshold amount of storage capacity has been reach in the document image database may also serve as a condition for triggering reanalysis. In this instance, all stored data files may be further modified according to storage preference rules.

Figure 8:
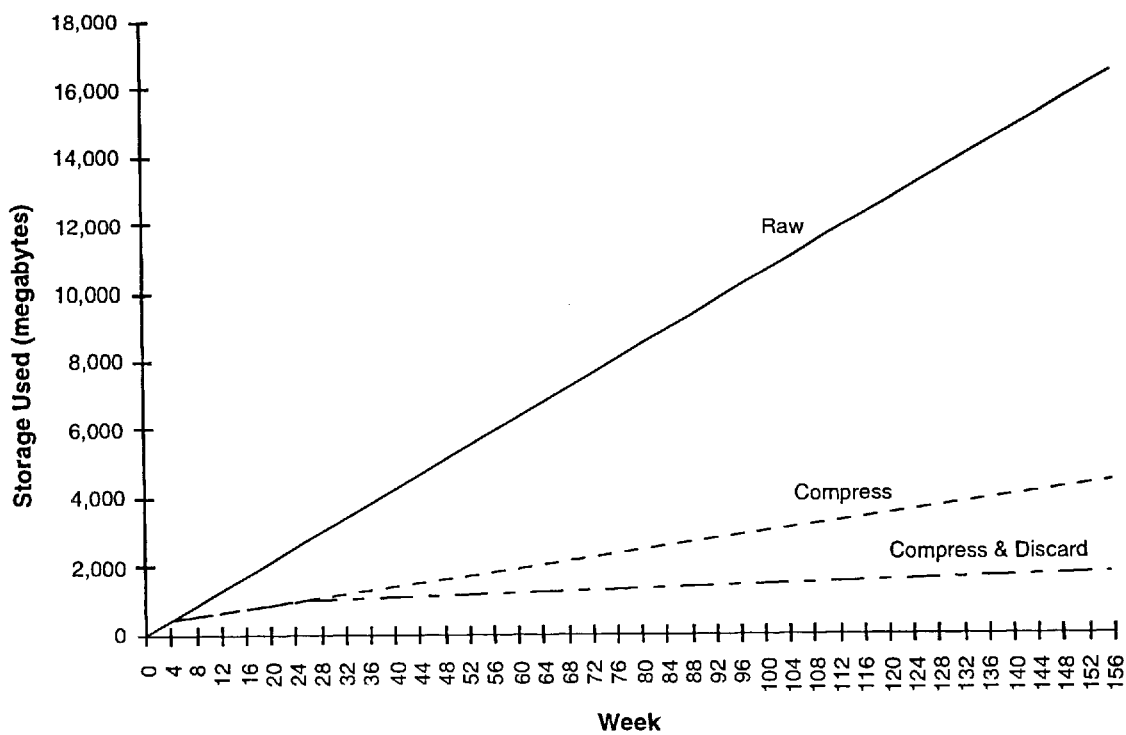
FIG. 8 is a chart illustrating the effects of three different storage management strategies applied to a hypothetical document image database over a three year period.

The effect of three other time-based storage management strategies are illustrated in FIG. 8. These three strategies are applied at varying time intervals over a three year period of a system in which it is assumed that a user will enter ten new documents a day into the system, each page requiring 2,112 kbytes to store. Expected growth in the size of this document image database without a storage management approach is indicated by the line marked "raw" in FIG. 8. A second approach compresses each document four weeks after it has entered the system by applying a moderate lossy compression scheme to photographic regions. The resulting storage size per page in this case is 529 kbytes and its impact on the system is shown as the "compressed" line. In addition to merely compressing data, stored documents determined to be of lesser importance may simply be discarded. Discarded data may include parts of a document, such as unimportant photos, or the entire document depending on the applicable storage preference rule. Alternatively, "discarding" may encompass moving lesser important documents off-line or to a slower medium outside the document image database. These "discarding" techniques may also systematically occur without the need for (manual) user intervention. By discarding 75% of the data from documents having been stored longer than six months in the system, the third approach (labelled "compressed and discarded") achieves even greater storage reduction. Net storage after three years is merely 1,841 megabytes for the "compressed and discarded" strategy as compared to 4,435 megabytes for "compressed" and 16,474 megabytes for "raw". This example illustrates the amount of storage saving possible by employing storage management strategies over the life a document image database system. One skilled in the art will appreciate that even better results can be achieved by combining various time-based document modification with storage preference rules tailored to meet the unique requirements of the database system.

Figure 9:
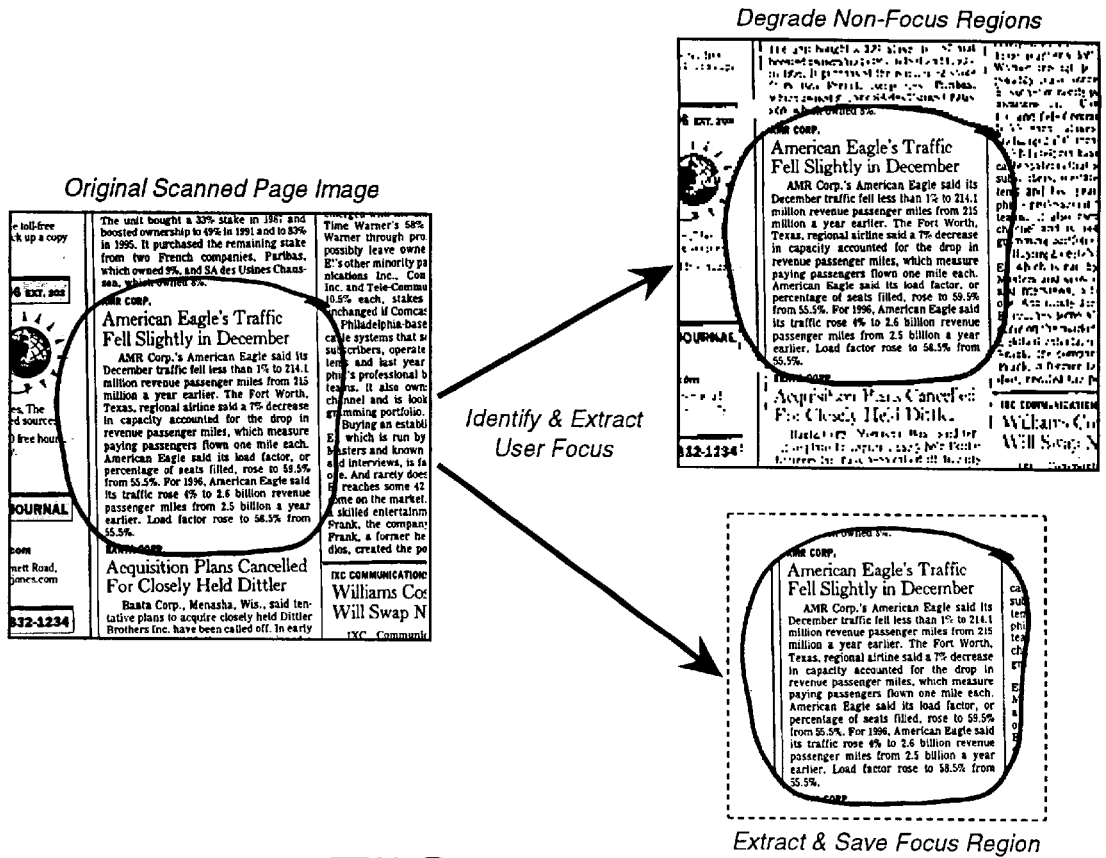
FIG. 9 is a functional diagram showing the steps for reducing storage capacity in a document image database based on user annotations using the storage management techniques of the present invention.

The functional diagram shown in FIG. 9 relies on annotations made by a system user to identify and modify regions within a stored document. First, user annotations may be used to identify particular regions of a document. An article in a newspaper may be "marked-up" or highlighted by a user before the document is inputted into the database system. A user interface with an electronic pen may also provide a means for annotating documents previously inputted into the system. Document analysis techniques can be used to identify the users marks and extract the associated regions from the stored data file. In the upper identified region, the identified text region is kept at its original resolution, while the remainder of the document is resampled down to 100 dpi or less. In the lower identified region, the identified text is merely extracted and remainder of the document is discarded. Thus, user annotations serve as another basis for identifying logical regions within a scanned document.

Second, user annotations may trigger particular storage preference rules. For example, a post-it note pre-printed with "important" on it or an "X" marked in the upper left comer of a document, as seen in FIGS. 10A and 10B, can be used to indicate that this individual document has been identified from a batch of documents. The identified document can then be sampled at a higher depth or resolution than other documents in the batch. Alternatively, the identified document may signify that this document is to be reanalyzed less frequently and/or discarded at a later time than other documents in the batch. One skilled in the art will appreciate that various means of annotating a document may be employed, subject to the limitations of image processing techniques. In addition, a variety of different storage preference rules can be triggered by different annotations.

Figure 11:
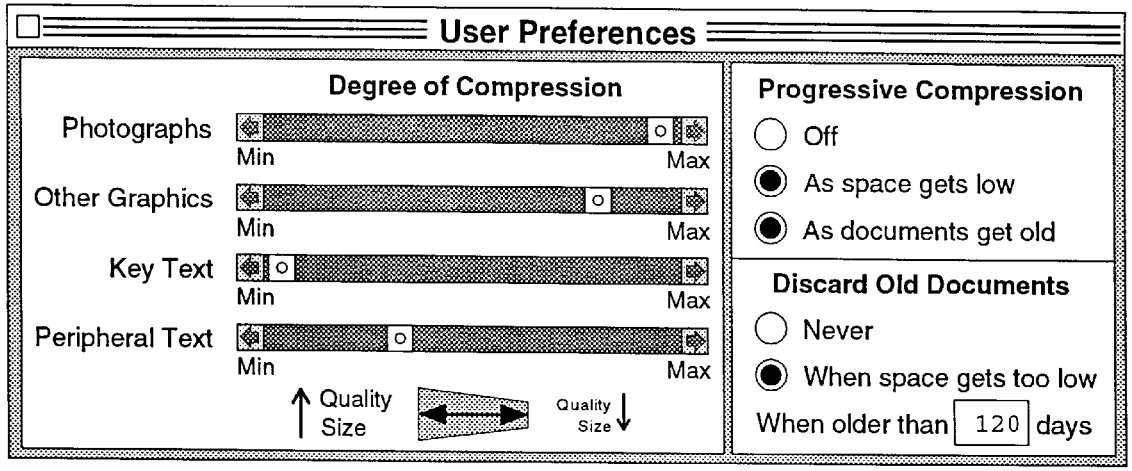
FIG. 11 is a dialog box of a user interface used for constructing storage preference rules in a document image database system.

Storage preference rules are stored within the document image database and can be accessed to determine which storage reduction means are applied to a particular region of a document. Storage preference rules may be set up through a system user interface, extracted from the inputted documents, or generated by an inference module within the system. First, obtaining storage preferences through a dialog box of a user interface is a common approach. A "mock-up" of a dialog box for a document image database is shown in FIG. 11. The user is allowed to specify the degree of compression applied to various logical regions of the document, as well as whether documents are further compressed depending on their age and amount of storage space available in the system. Preferences could be specified on a per-document basis or for all documents entered into the system. It should be appreciated by one skilled in the art that more sophisticated user interfaces could be developed for creating more advance storage preference rules.

Second, storage preference rules may be extracted directly from the inputted documents. Rather than merely trigger the application of a predetermined storage preference rule, a users annotation may encapsulate a storage preference rule. For instance, an annotation, such as "compress all photos" or "discard if not viewed in six months", may be written on the document or a "post-it" note containing a bar code may be attached to the document. Documents with example user annotations are illustrated in FIGS. 12A and 12B. By interpreting user annotations, the document image database system will apply the appropriate storage reduction means to implement the storage strategy. Unlike existing approaches, a user annotation may be directly targeted to a specific region within the document. Those skilled in the art will readily recognize that by using optical character recognition techniques, system software can be constructed to translate a user's annotation into a defined storage preference rule.

Third, it is desirable that the document image database system have an ability to "leam" preferences over time. Using artificial intelligence or other inference computing techniques, storage preference rules may be generated based upon previous user patterns when interacting with the document image database system. The system may employ a hierarchy for determining which storage preference rule to apply between conflicting rules constructed by different means. For example, user annotations be applied before system generated rules, while user inputted rules will serve as the default. Regardless of the construction means, document modification will be applied to a document based on the applicable storage reference rule.

Figure 13:
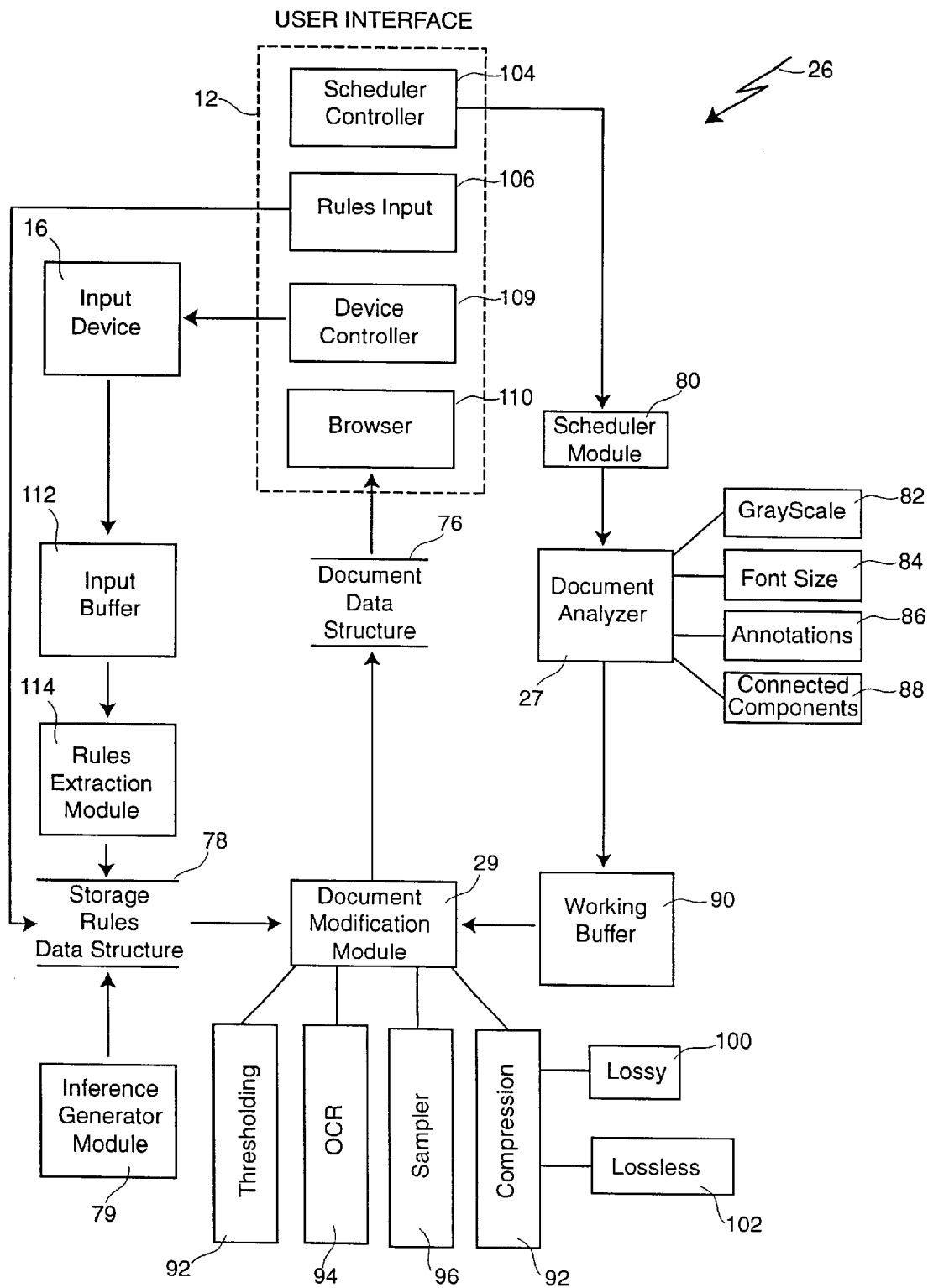
FIG. 13 is a block diagram showing the components of the apparatus in a preferred embodiment.

A preferred embodiment of the apparatus 26 of the present invention is shown in FIG. 13. The document image database 14 has been further defined as a document data structure 76 for storing document images and a storage rules data structure 78 for storing storage preference rules. The document analyzer module 27 is coupled to the document data structure 76. A scheduler module 80 is also coupled to the document analyzer module 27 for initiating the document analysis process. To facilitate document analysis, the document analyzer module 27 further comprises a grey scale data analyzer 82, a font size analyzer 84, an annotation recognizer 86, and a connected component analyzer 88. A working buffer 90 is used to hold data files during the document analysis/modification process and is coupled between the document analyzer module 27 and the document modification module 29. The document modification module 28 includes a thresholder 92, an optical character recognizer 94, a sampler 96, and a compression subsystem 98, where said compression subsystem 98 includes a lossy compressor 100 and a lossless compressor 102 for modifying data files according to storage preference rules accessed from the storage rules data structure 78. An inference generator module 79 also accesses the storage rules data structure 78. These modules comprise the core components of the apparatus 26.

In addition, the user interface 20 is comprised of a browser 110, device controller 108, a rules inputter 106 and a schedule controller 104. The user interface 20 is coupled to the document data structure 76 through the browser 110 for viewing stored documents and coupled to the storage rules data structure 78 through the rules inputter 106 for manipulating storage preference rules. A device controller 108 associated with the user interface 20 is used to control input parameters of an input device 16. The input device 16 is coupled to the document data structure 76 through an input buffer 112 for manipulating document images prior to storage. A rules extraction module 114 is coupled to input buffer 112 for extracting storage preference rules that may be located on inputted documents. Extracted storage preference rules are then stored in storage rules data structure 78. An inference generator module 79 is also coupled to storage rules data structure 78 for inputting generated storage preference rules. Finally, the schedule controller 104 of the user interface 20 is coupled to the scheduler module 80 for user initiated document analysis.

The foregoing disdoses and describes merely exemplary embodiments of the present invention. One skilled in the art will readily recognize from such discussion, and from the accompanying drawings and claims, that various changes, modifications and variations can be made therein without departing from the spirit and scope of the present invention.

What is claimed is:

1. A method of managing the storage of documents in a document image database, said documents having been converted into a digital data file, comprising the steps of:
   providing as input said data file that contains undifferentiated regions of both text and non-text;
   analyzing said data file using identification rules to differentiate between regions containing text and regions containing non-text;
   repeatedly modifying said differentiated regions containing non-text according to storage preference rules based on a time parameter associated with said data file to reduce storage size such that the storage size gradually reduces as a function of elapsed time;
   compiling said modified regions into a reduced data file; and
   storing said reduced data file in said database.

2. The method of claim 1 further comprising the step of using histogram analysis in order to identify whether said regions contain text or non-text.

3. The method of claim 1 wherein said identification rules identify a region based upon annotations captured from said document.

4. The method of claim 1 wherein said storage reduction means includes reducing storage size of said regions by reducing sampling depth of said region.

5. The method of claim 1 wherein said storage reduction means includes reducing storage size of said regions by reducing sampling resolution of said region, whereby said sampling resolution is determined by minimum feature size in said region having a text data type.

6. The method of claim 1 wherein said storage reduction means includes reducing storage size of said region by compressing a said region.

7. The method of claim 6 wherein said compression is further defined as a lossless compression means, whereby said lossless compression means is applied to said region having at least one of text data type and graphic data type.

8. The method of claim 6 wherein said compression is further defined as a lossy compression means, whereby said lossy compression means is applied to said region having a graphic data type.

9. The method of claim 1 wherein said storage reduction means includes discarding at least one of said regions in said data file.

10. The method of claim 1 further comprising the step of using connected component analysis in order to identify whether said regions contain text or non-text.

11. The method of claim 1 wherein said storage preference rules modify said region based upon user annotations made on said document.

12. The method of claim 1 wherein said storage preference rules are generated by a preference module, such that the generated preference rules are based upon previous preference patterns used by said system.

13. The method of claim 1 further including the step of:
reanalyzing said reduced data file, whereby said reanalyzing is triggered by a condition within said database system; and
modifying said reduced data file according to said storage preference rules.

14. The method of claim 13 wherein said condition is further defined as an amount of time since said document was converted into a data file.

15. The method of claim 13 wherein said condition is further defined as an amount of time since a user last accessed said data file.

16. The method of claim 13 wherein said condition is further defined as exceeding a threshold amount of storage capacity as measured within said database system.

17. A method of managing the storage of documents in a document image database system, said documents having been converted into digital data files, comprising the steps of:
providing as input at least one of said data files, said data file containing undifferentiated regions of both text and non-text;
analyzing data within said data file to differentiate between at least two regions, said first region containing text and said second region containing non-text;
modifying said differentiated regions in order to reduce storage size of said regions;
compiling said reduced regions into a reduced data file;
storing said reduced data file in said database;
analyzing said reduced data file, whereby said analyzing is triggered by a condition within said database system to further reduce storage size of said reduced data file; and
modifying said reduced data file according to storage preference rules, wherein said reduced data file is modified by storage reduction means for reducing storage size of said second region of said reduced data file such that storage size of said first region remains unchanged.

18. The method of claim 17 wherein said condition is further defined as an amount of time since said document was converted into a data file.

19. The method of claim 17 wherein said condition is further defined as an amount of time since a user last accessed said data file.

20. The method of claim 17 wherein said condition is further defined as exceeding a threshold amount of storage capacity as measured within said database system.

21. A computer-implemented apparatus for supporting storage management system for documents in a document image database, said documents having been converted into a digital data files, comprising:
a database for storing said data files;
an input to an analyzing module, said input providing as an input at least one of said data files, said data file containing undifferentiated regions of both text and non-text;
said analyzing module coupled to said database for identifying at least two regions within the data file, said first region substantially containing text and said second region substantially containing non-text, said analyzing module partitioning said document into said regions; and
a modification module coupled to at least one of said database and analyzing module for reducing storage size of said identified regions as a function of elapsed time.

22. The apparatus of claim 21 wherein said database includes a document data structure for storing said data files and a storage rules data structure for storing said storage preference rules.

23. The apparatus of claim 21 wherein said analyzing module further comprises a grayscale data analyzer, a connected-component analyzer, a font size analyzer, and a annotation analyzer.

24. The apparatus of claim 21 wherein said modifying module further comprises a thresholder, an optical character recognizer, a sampler, and a compression subsystem, where said compression subsystem includes a lossy compressor and a lossless compressor.

25. The apparatus of claim 21 further comprising a memory accessible by at least one of an input device, said analyzing module, said modification module and said database for processing said data files, wherein said memory includes an input buffer and a working buffer.

26. The apparatus of claim 21 further comprising a scheduler module coupled to said analyzing module for triggering reanalysis of said data files based on a condition within said system.

27. The apparatus of claim 21 further comprising a user interface coupled at least of an input device and said database, wherein said user interface includes a browser means for viewing said data files, a device control means for controlling input parameters of a input device, and a rule input means for manipulating said storage preference rules.

28. The apparatus of claim 21 further comprising a preference extracting module coupled to said database for extracting storage preference rules from said data files.

29. The apparatus of claim 21 further comprising an inference module coupled to said database for generating storage preference rules based upon previous preference patterns used by said system.

30. A computer-implemented apparatus for supporting storage management system for documents in a document image database, said documents having been converted into digital data files, comprising:

a database for storing said data files;

an input to an analyzing module, said input providing as an input at least one of said data files, said data file containing undifferentiated regions of both text and non-text;

an analyzing module coupled to said database for identifying at least two regions within said data file and for partitioning said data file into said regions, said first region containing text and said second region containing non-text;

a modification module coupled to at least one of said database and analyzing module for reducing storage size of said identified regions of said data file into a reduced data file according to storage preference rules; and a scheduler module coupled to said analyzing module for triggering reanalysis of said reduced data file based on a condition within said system such that the second region can be reduced in storage size without reducing the first region.

31. The apparatus of claim 30 wherein said condition is further defined as an amount of time since said document was converted into a data file.

32. The apparatus of claim 30 wherein said condition is further defined as an amount of time since a user last accessed said data file.

33. The apparatus of claim 30 wherein said condition is further defined as exceeding a threshold amount of storage capacity as measured within said database system.

* * * * *